United States Patent
Busch-Sorensen et al.

(10) Patent No.: US 10,121,297 B2
(45) Date of Patent: *Nov. 6, 2018

(54) VISION-BASED FARE COLLECTION

(71) Applicant: Cubic Corporation, San Diego, CA (US)

(72) Inventors: Thomas Busch-Sorensen, San Diego, CA (US); Pradip Mistry, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,196

(22) Filed: Feb. 7, 2018

(65) Prior Publication Data

US 2018/0174386 A1    Jun. 21, 2018

Related U.S. Application Data (63) Continuation of application No. 15/244,631, filed on Aug. 23, 2016, now Pat. No. 9,972,149.

(Continued)

(51) Int. Cl.
*G05B 19/00* (2006.01)
*G05B 23/00* (2006.01)
(Continued)

(52) U.S. Cl.
CPC ...... *G07C 9/00111* (2013.01); *G06K 7/10366* (2013.01); *G06Q 10/10* (2013.01);
(Continued)

(58) Field of Classification Search
CPC .. G07C 9/00111; G07C 9/02; G07C 9/00031; G07C 9/00158; G07C 9/00007;
(Continued)

(56) References Cited

U.S. PATENT DOCUMENTS

| 9,972,149 B2 | 5/2018 | Busch-Sorensen et al. |
| 2004/0017929 A1 | 1/2004 | Bramblet et al. |

(Continued)

FOREIGN PATENT DOCUMENTS

| WO | 99/23613 A1 | 5/1999 |
| WO | 2017/035184 A1 | 3/2017 |

OTHER PUBLICATIONS

International Search Report and Written Opinion dated Nov. 8, 2016 for PCT/US2016/048305; all pages.

(Continued)

*Primary Examiner* — Emily C Terrell
(74) *Attorney, Agent, or Firm* — Kilpatrick Townsend & Stockton (57) ABSTRACT

Systems and methods for implementing vision-based fare collection using one or more cameras positioned within a transit station. The system may determine that a user is approaching an entry point separating a non-restricted access area from a restricted access area. Using a camera and/or an RFID transceiver, the system may track the location of the user as the user approaches the entry point. The system may determine that the user is permitted to access the restricted access area, and may allow the user to access the restricted access area via the entry point upon the user being within a threshold distance from the entry point.

20 Claims, 9 Drawing Sheets

Related U.S. Application Data (60) Provisional application No. 62/209,266, filed on Aug. 24, 2015.

(51) Int. Cl.

| | | |
|---|---|---|
| *G06F 7/00* | (2006.01) | |
| *G06F 7/04* | (2006.01) | |
| *G06K 19/00* | (2006.01) | |
| *G08B 29/00* | (2006.01) | |
| *G08C 19/00* | (2006.01) | |
| *H04B 1/00* | (2006.01) | |
| *H04B 1/38* | (2015.01) | |
| *H04Q 1/00* | (2006.01) | |
| *H04Q 9/00* | (2006.01) | |
| *G07C 9/00* | (2006.01) | |
| *H04W 4/04* | (2009.01) | |
| *G06K 7/10* | (2006.01) | |
| *G06Q 10/10* | (2012.01) | |
| *H04W 4/30* | (2018.01) | |
| *H04W 4/33* | (2018.01) | |

(52) U.S. Cl.
CPC ............... *H04W 4/04* (2013.01); *H04W 4/30* (2018.02); *H04W 4/33* (2018.02)

(58) Field of Classification Search
CPC ............ G07C 9/00079; G07C 9/00103; G07C 9/00119; G07C 9/00166; G06Q 20/206; G06Q 20/32; G06Q 20/3278; G06Q 20/40145; G06Q 30/0601; G06Q 20/00; G06Q 20/04; G06Q 20/14; G06Q 20/20; G06Q 20/28; G06Q 20/341; G06Q 20/342; G06Q 20/4014; G07B 15/00; B64F 1/366; G07G 1/009; H04L 2209/56; H04L 2209/805; H04L 63/0853; H04L 63/10; H04L 9/3231; H05K 7/1498

USPC ................. 340/5.61, 5.6, 5.7, 5.8–5.83, 5.28
See application file for complete search history.

(56) References Cited

U.S. PATENT DOCUMENTS

| | | |
|---|---|---|
| 2004/0036574 A1 | 2/2004 | Bostrom |
| 2006/0017541 A1* | 1/2006 | Nguyen ............. G07C 9/00111 340/5.81 |
| 2006/0243796 A1 | 11/2006 | Macklin et al. |
| 2007/0252001 A1 | 11/2007 | Kail et al. |
| 2007/0273514 A1 | 11/2007 | Winand et al. |
| 2008/0208680 A1 | 8/2008 | Cho |
| 2009/0119213 A1 | 5/2009 | Hammad et al. |
| 2011/0001606 A1 | 1/2011 | Charych |
| 2012/0278137 A1 | 11/2012 | Dixon et al. |
| 2015/0012436 A1 | 1/2015 | Poole et al. |
| 2016/0012465 A1 | 1/2016 | Sharp |

OTHER PUBLICATIONS

International Preliminary Report on Patentability dated Mar. 9, 2018 for PCT/US2016/048305; all pages.
U.S. Appl. No. 15/244,631, "Final Office Action" dated May 1, 2017, 22 pages.
U.S. Appl. No. 15/244,631, "First Action Interview Office Action Summary" dated Feb. 17, 2017, 21 pages.
U.S. Appl. No. 15/244,631, "First Action Interview Pilot Program Pre-Interview Communication" dated Dec. 27, 2016, 20 pages.
U.S. Appl. No. 15/244,631, "Non-Final Office Action" dated Dec. 27, 2017, 24 pages.
U.S. Appl. No. 15/244,631, "Notice of Allowance" dated Mar. 21, 2018, 13 pages.

* cited by examiner

VISION-BASED FARE COLLECTION

CROSS-REFERENCES TO RELATED APPLICATIONS

This application is a continuation of U.S. patent application Ser. No. 15/244,631, filed Aug. 23, 2016, entitled "VISION-BASED FARE COLLECTION," which is a non-provisional of and claims the benefit of priority to U.S. Provisional Patent Application No. 62/209,266, filed Aug. 24, 2015, entitled "VISION-BASED FARE COLLECTION," the entire content of each of which is herein incorporated in its entirety.

BACKGROUND OF THE INVENTION

Fare collection for public and private transportation systems generally requires that the transit user purchases a ticket prior to entry into the transportation system, followed by the user presenting the purchased ticket at a gate either to a machine (in an automated fare collection system) or to a transit personnel. As transportation systems become burdened with increased ridership, ticketing gates become increasingly congested, causing delays to transit users and increased costs to the transportation systems. Another issue exists where transportation systems are unable to provide a hands-free approach for wheelchair users who may have difficulty presenting a paper ticket prior to entry. Systems and methods for increased efficiency in the area are needed.

BRIEF SUMMARY OF THE INVENTION

Embodiments described herein may include methods, systems, and other techniques for implementing vision-based fare collection. For example, a method may include determining that a user is approaching an entry point. The entry point may define a passageway and separate a non-restricted access area from a restricted access area. The method may also include tracking the location of the user as the user approaches the entry point. The tracking may be performed using a camera. The method may further include determining that the user is permitted to access the restricted access area. In some embodiments, the method may include determining that the user is within a threshold distance from the entry point. The method may also include allowing the user to access the restricted access area via the entry point upon the user being within the threshold distance from the entry point.

In some embodiments, the method may include detecting, using an RFID receiver, an RFID tag located within a particular distance from the user. The RFID tag may have information linking to an account balance of the user. The method may also include determining that the RFID tag is associated with the user. The method may further include determining that the user is permitted to access the restricted access area based on the information linking to the account balance of the user. In some embodiments, the method may include facilitating tracking, using the RFID receiver, the location of the user as the user approaches the entry point.

The method may also include determining that the user is permitted to access the restricted access area based on the user purchasing a ticket at a ticket vending machine. The method may further include determining that the user is permitted to access the restricted access area based on detection of a portable communications device located within a particular distance from the user. In some embodiments, allowing the user to access the restricted access area includes opening a gate or turnstile at the entry point. The method may also include detecting, using a sensor, one or more unique identifiers associated with the user.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Various specific embodiments will be described below with reference to the accompanying drawings constituting a part of this specification. It should be understood that, although structural parts and components of various examples of the present disclosure are described by using terms expressing directions, e.g., "front", "back", "upper", "lower", "left", "right" and the like in the present disclosure, these terms are merely used for the purpose of convenient description and are determined on the basis of exemplary directions displayed in the accompanying drawings. Since the embodiments disclosed by the present disclosure may be set according to different directions, these terms expressing directions are merely used for describing rather than limiting. Under possible conditions, identical or similar reference numbers used in the present disclosure indicate identical components.

Systems, methods, and techniques are provided in the present disclosure for implementing vision-based fare collection. Vision-based fare collection systems described herein may improve passenger throughput across stations and lines of a city rapid transit system without the need for expanding current transit systems with additional gates and transit personnel. Cameras and/or RFID tags allow passengers to be identified at a distance and allow a hands-free experience for transit users. Passengers may be identified using various sensors that detect one or more unique identifiers associated with the passengers. Passengers may also be identified using the RFID tags which may provide information linking to their account balances. The vision-based fare collection system described herein may be implemented in many types of public and private transportation systems, including airlines, taxis, city buses, long-distance buses, trolleybuses, trams, light rail, rapid transit, people movers, commuter rail, monorail suspension railways, personal rapid transit, ferries, and the like. The term "restricted access area" may have different meanings in different transportation systems. For example, in a light rail transportation system, the restricted access area may include both the inside of the trains and the platforms surrounding the train tracks. In a city bus transportation system, the restricted access area may only include the inside of the bus.

In some embodiments, the vision-based fare collection system described herein may include a barrier placed across a gate. The barrier may be retracted when it is determined that a transit user is properly entering or exiting a restricted access area, or conversely, the barrier may be placed when a transit user is improperly entering or exiting a restricted access area. In some embodiments, gates may be barrierless and may instead include an audible and/or visual alarm to prevent a transit user from improperly entering or exiting a restricted access area.

Used herein, the term "camera" may refer to any optical device for recording video and/or images. Cameras described herein may be stationary, moveable, controllable, motion-activated, laser-triggered, ceiling-mounted, wall-mounted, floor-mounted, digital, analog, and the like.

Used herein, the term "RFID" may refer to any communication technology employing electromagnetic waves, fields, and/or signals to identify and track stationary or moving objects. The term "RFID tag" may refer to any communication device that may be carried by or secured to an object. RFID tags may be passive, active, or battery-assisted passive. Active RFID tags have on-board batteries and periodically or constantly transmit wireless signals with identifying information. Battery-assisted passive RFID tags have small batteries on board and are activated when they are near an RFID reader. Passive RFID tags lack on-board batteries and are instead energized by the wireless signals received from RFID readers. RFID tags may have individual serial numbers or IDs that allow each individual RFID tag to be identified from among a larger group. In some embodiments, an RFID tag may be a credit card sized carrier or a key fob. RFID tags may operate in a 13.56 MHz band (HF), a 900 MHz band (UHF), or a 2.4 GHz band, among others. In some embodiments, UHF tags may co-exist with HF tags and vice-versa. In some embodiments, RFID tags may be used as tokens in an account based system so that only a serial number needs to be read to access an account. In other embodiments, a system may interact with the RFID tags and read and write data to them. For example, instead of an RFID tag containing information for linking to an account via a serial number or ID, the tag may ping back modifiable information regarding a balance. In some embodiments, an RFID tag may support mutual authentication to prevent spoofing or replay attacks. In some embodiments, active RFID tags may be turned on and off by a user pressing a button on or near the RFID tag. For example, a wheelchair user may press a button fixed to their wheelchair to power an active RFID tag. Such embodiments may save power and preserve battery life.

Used herein, the term "RFID reader" may refer to any communication device that may transmit and/or receive wireless signals to or from an RFID tag. The term "RFID reader" may be used interchangeably with the terms "RFID transceiver", "RFID transmitter", "RFID receiver", "transceiver", "transmitter", "receiver", "transmitter antenna", "receiver antenna", and "antenna". For example, in embodiments where several transceivers are disclosed as being ceiling-mounted, some embodiments may include transmitters and/or receivers being ceiling-mounted. Similarly, in embodiments where several antennas are disclosed as being ceiling-mounted, some embodiments may include RFID transceivers, RFID transmitters, and/or RFID receivers being ceiling-mounted.

An RFID transmitter may be a narrow beam antenna or an omnidirectional antenna, which, in some embodiments may cover a 180 degree hemisphere. Similarly, an RFID receiver may be a narrow beamwidth antenna or an omnidirectional antenna. In some embodiments, a narrow beam antenna may be focused to eliminate unfavorable near field patterns. In some embodiments, multiple RFID receivers may share antenna elements in a phased array fashion, or may be individual, larger antennas for different channels. In some embodiments, antennas may have circular polarization so that they can communicate with RFID tags regardless of their orientation.

Figure 1:
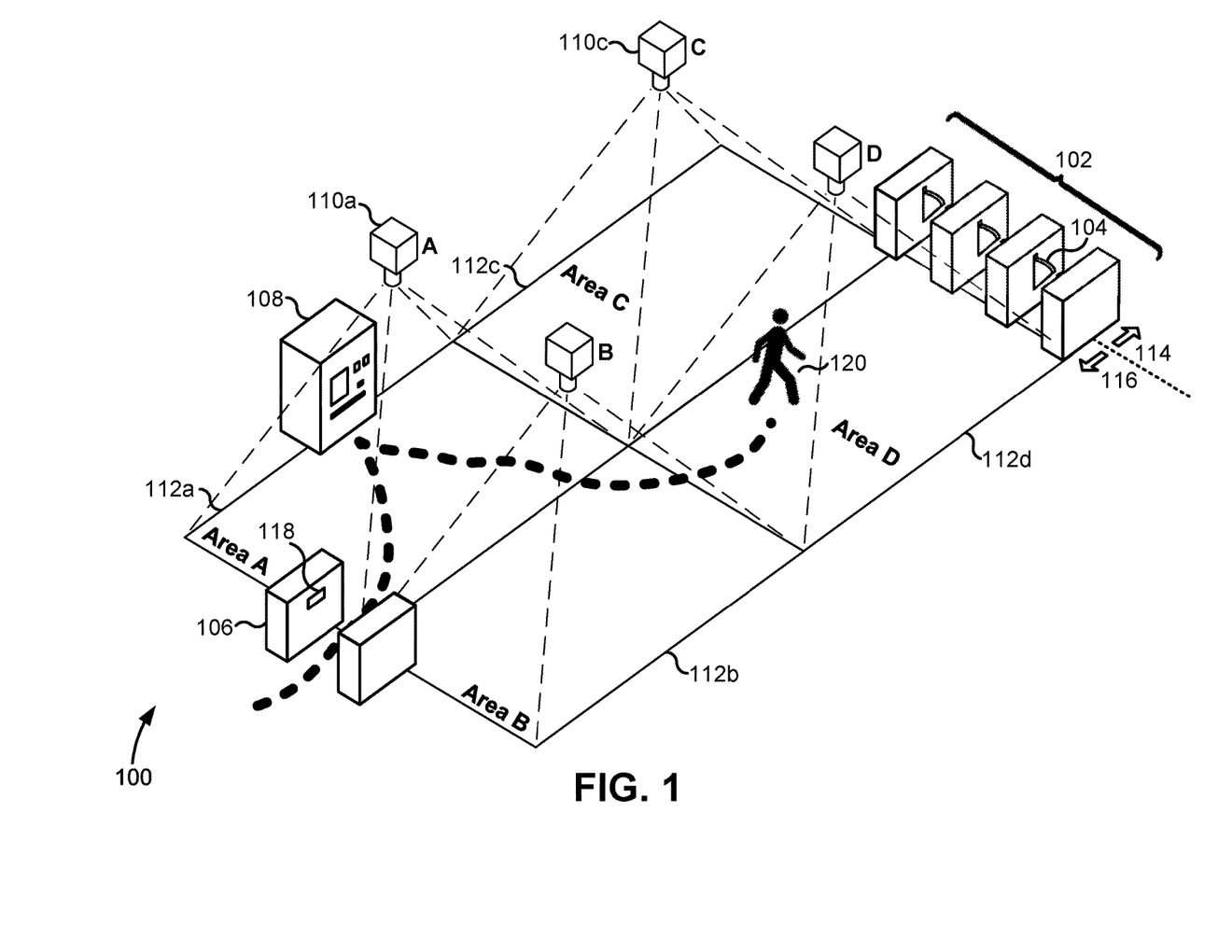
FIG. 1 shows a perspective view of a vision-based fare collection system, according to some embodiments of the present disclosure.

FIG. 1 shows a perspective view of a vision-based fare collection system 100, according to some embodiments of the present disclosure. The vision-based fare collection system 100 may include a gate array 102, a station entry 106, a ticket vending machine 108, and cameras 110. In general, the gate array 102 (also referred to herein as an entry point) may be similar to a typical gateline used in transportation systems or environments. The gate array 102 may include one or more gates and gate cabinets which create passageways through the gate array 102. The gate array 102 may separate a restricted access area 114 from an unrestricted access area 116. In some embodiments, the gate array 102 may include gate barriers 104. The gate barriers 104 may comprise various types of physical barriers to impede access to the restricted access area 114, such as turnstiles, sliding doors, boom gates, or the gate barriers shown in FIG. 1. In some embodiments, to improve efficiency at gates that experience relatively high passenger volume periods, it may be beneficial for the gate array 102 to include barrierless gates. In general, a barrierless gate defines an unimpeded or open passageway that leads from the non-restricted access area 116 to the restricted access area 114, and vice-versa.

The station entry 106 may be located at or near an entrance to a transit station. The vision-based fare collection system 100 may include a single station entry or multiple station entries. In some embodiments, the station entry 106 may be RFID enabled such that RFID transceivers 118 may be equipped on or near the station entry 106 and may detect RFID tags carried by passengers as they pass through the station entry 106. In some embodiments, RFID tags carried by passengers may link to an account and/or an account balance of the passengers. In this manner, the vision-based fare collection system 100 may determine whether passengers carrying RFID tags are permitted to access the restricted access area 114.

The ticket vending machine 108 may give passengers an option to exchange payment for a transit fare and/or ticket. Passengers may purchase a single ticket, multiple tickets, or a transit pass associated with a number of tickets or a period of time, among other possible purchasable items. In some embodiments, the ticket vending machine 108 may issue a physical fare. In some embodiments, the ticket vending machine 108 may issue electronic tickets via digital delivery to a an electronic device. In some embodiments, where a passenger purchases a single ticket, the ticket vending machine 108 may not issue a physical ticket or an electronic ticket, and may instead notify the vision-based fare collection system 100 that a passenger 120 has purchased a single ticket and should be permitted to access the restricted access area 114. The ticket vending machine 108 may be located inside and/or outside the transit station, and may include multiple ticket vending machines.

Cameras 110 may be positioned inside and/or outside the transit station to provide visual coverage areas 112 of the walking area of the transit station. In some embodiments, cameras 110 are positioned such that all possible walking areas of the transit station are covered by at least one visual coverage area. In some embodiments, visual coverage areas 112 may overlap significantly with each other and may correspond to different visual angles of the walking area, depending on the positioning of cameras 110. For example, although FIG. 1 shows cameras 110a, 110b, 110c, and 110d as having non-overlapping camera coverage areas 112a, 112b, 112c, and 112d, in some embodiments camera coverage areas 112a, 112b, 112c, and 112d may perfectly overlap, thus covering the same walking area. It is generally advantageous that at least one visual coverage area cover the walking area surrounding the ticket vending machine 108, such that passengers who purchase tickets may be tracked as they approach the gate array 102. In this manner, the vision-based fare collection system 100 may determine whether passengers purchasing tickets via the ticket vending machine 108 are permitted to access the restricted access area 114.

Figure 2:
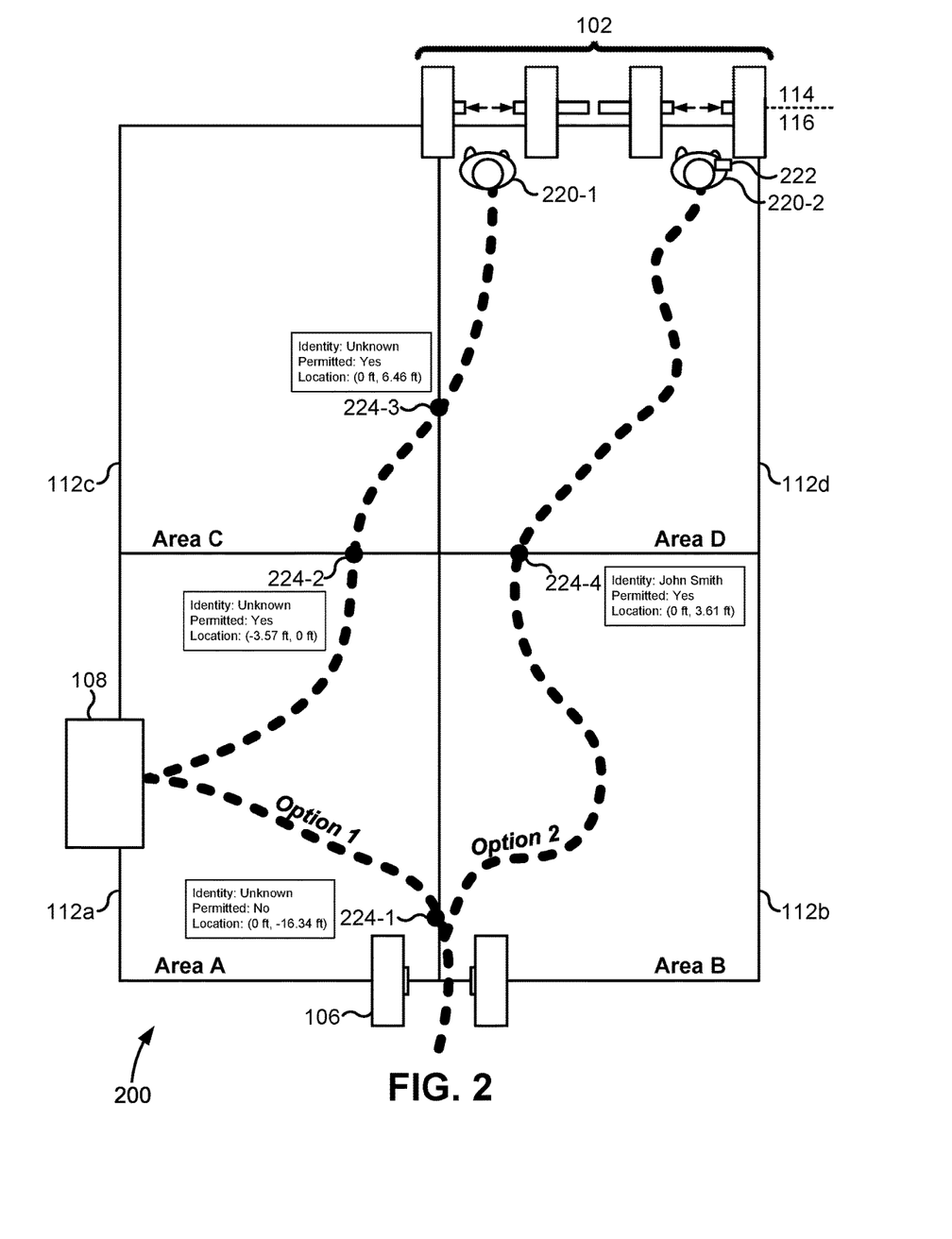
FIG. 2 shows a top view of a vision-based fare collection system, according to some embodiments of the present disclosure.

FIG. 2 shows a top view of a vision-based fare collection system 200 comprising a gate array 102, a station entry 106, a ticket vending machine 108, and visual coverage areas 112, according to some embodiments of the present disclosure. In some embodiments, the vision-based fare collection system 200 may increase passenger throughput at the gate array 102 by tracking the location of passengers and determining whether passengers are permitted to access the restricted access area 114 prior to walking through the gate array 102. The vision-based fare collection system 200 may accomplish this by associating information with each located passenger in the transit station and continually updating this information based on the passenger's activities.

In some embodiments, passenger tracking may generally occur according to one of two methods. In the first method (denoted as "Option 1" in FIG. 2), a passenger 220-1 who is not carrying an RFID tag linking to an account walks through the station entry 106. At this point, camera 110b begins tracking the unidentified passenger. As the passenger 220-1 walks from Area B to Area A (visual coverage area 112b to visual coverage area 112a) at transition point 224-1, camera 110b sends transition information to camera 110a and/or to the vision-based fare collection system 200. Transition information may include one or more of the following: the identity of the passenger, whether the passenger is permitted to access the restricted access area 114, the location of the passenger immediately prior to or at the transition point, one or more biometric identifiers of the passenger, an account identifier of the passenger, an account balance of the passenger, and the like. When the transition information is received by camera 110a and/or the vision-based fare collection 200, camera 110a attempts to locate the passenger 220-1 at the location noted in the transition information. When the passenger 220-1 is located, their location continues to be tracked by camera 110a until the passenger 220-1 reaches another transition point. During this time, the transition information received at transition point 224-1 continues to be associated with the passenger 220-1 and updated based on the passenger's 220-1 activities.

When the passenger 220-1 purchases a ticket at the ticket vending machine 108, the information associated with the passenger 220-1 may be modified so that the passenger 220-1 is designated as permitted to access the restricted access area 114. As the passenger walks from Area A to Area C (visual coverage area 112a to visual coverage area 112c) at transition point 224-2, camera 110a sends transition information to camera 110c and/or to the vision-based fare collection system 200 indicating a location and that the passenger 220-1 is permitted to access the restricted access area 114. A similar step occurs at transition point 224-3. As the passenger 220-1 approaches the gate array 102 and the vision-based fare collection system 200 determines that the passenger 220-1 is near the gate array 102, the passenger 220-1 may be allowed to access the restricted access area 114. In some embodiments, a barrier within the gate array 102 that corresponds to the passenger's path may be retracted so that the passenger may continue to walk at a continuous speed through the gate array 102. After the passenger 220-1 walks through the gate array 102, the barrier that was retracted may be restored to prevent a nearby unpermitted passenger from accessing the restricted access area 114.

In the second method (denoted as "Option 2" in FIG. 2), a passenger 220-2 who is carrying an RFID tag 222 linking to an account walks through the station entry 106. Because the station entry 106 is RFID enabled, one or more RFID transceivers positioned on or near the station entry 106 may communicate with the RFID tag 222. At this point, camera 110b begins tracking the identified passenger. The vision-based fare collection system 200 may also determine that the passenger 220-2 is permitted to access the restricted access area 114 based on the account information, such as the passenger 220-2 having sufficient funds in their account balance, or the account information indicating some other reason for which the passenger 220-2 is permitted. As the passenger 220-2 walks from Area B to Area D (visual coverage area 112b to visual coverage area 112d) at transition point 224-4, camera 110b sends transition information to camera 110d and/or to the vision-based fare collection system 200 indicating a location and that the passenger 220-2 is permitted to access the restricted access area 114. Similar to the first method, as the passenger 220-2 approaches the gate array 102 and the vision-based fare collection system 200 determines that the passenger 220-2 is near the gate array 102, the passenger 220-2 may be allowed to walk through the gate array 102 at a continuous speed.

After the passenger 220-2 walks through the gate array 102, any retracted barrier may be immediately restored.

Figure 3:
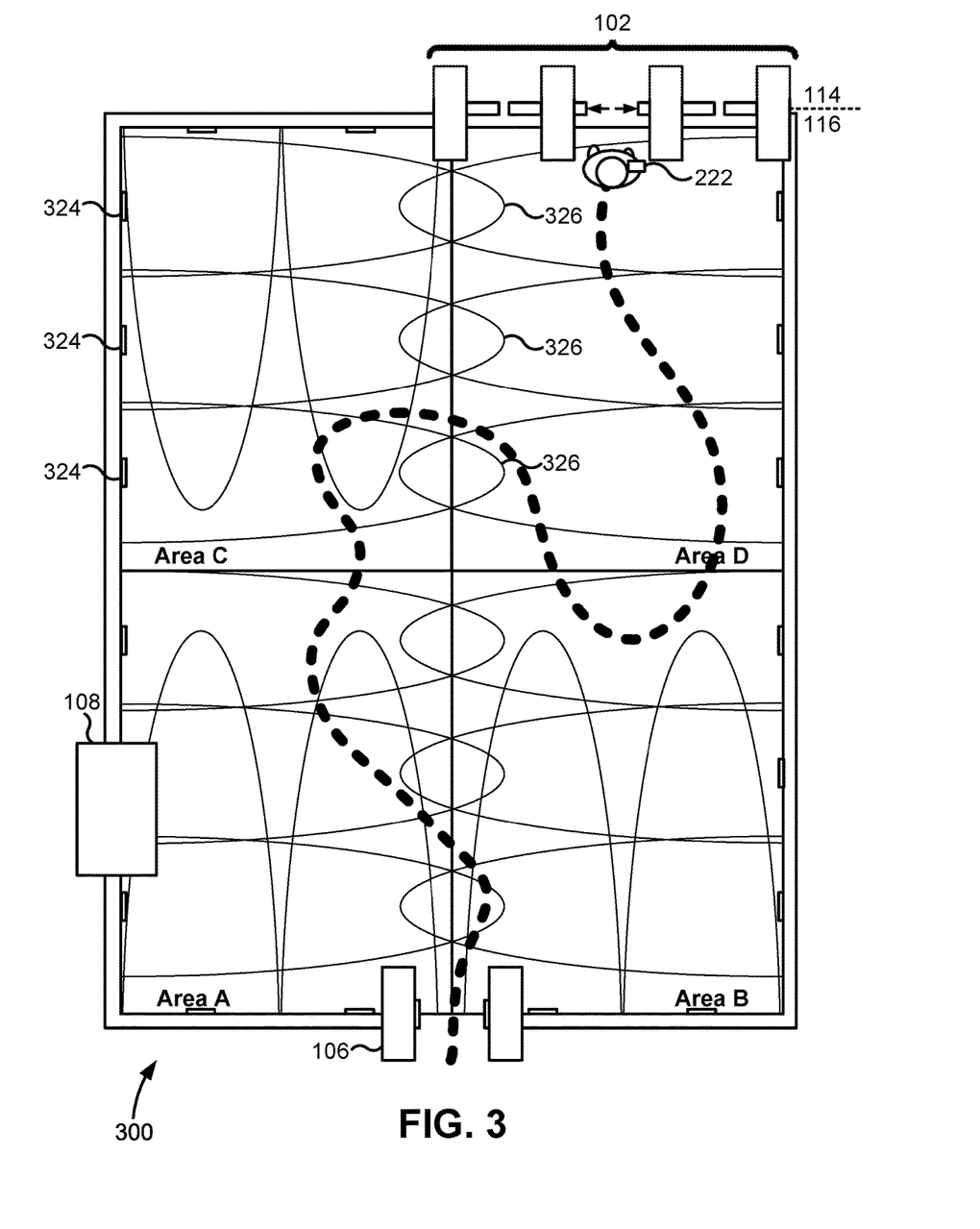
FIG. 3 shows a top view of a vision-based fare collection system with side RFID transceivers, according to some embodiments of the present disclosure.

FIG. 3 shows a top view of a vision-based fare collection system 300 with side RFID transceivers 324 that are configured to communicate with an RFID tag 222, according to some embodiments of the present disclosure. The RFID transceivers 324 may be positioned along walls, gates, pillars, railings, and other objects within the transit station so that the beams of the antennas are directed in the horizontal direction. Information gathered by the RFID transceivers 324 while the RFID tag 222 is inside RFID coverage areas 326 may be used to supplement location tracking information gathered by cameras 110. In some embodiments, this information may also be used to increase the accuracy of the identification process of passengers whose locations are being tracked.

In some embodiments, the RFID transceivers 324 may emit electromagnetic waves which comprise electromagnetic fields which reach the RFID tag 222. In response to receiving the electromagnetic fields from the RFID transceivers 324, the RFID tag 222 may emit electromagnetic fields containing identification information. Both the electromagnetic fields emitted by the RFID transceivers 324 and the electromagnetic fields emitted by the RFID tag 222 comprise a frequency, phase, and magnitude (i.e., amplitude) at which they are emitted. The values of the frequency, phase, and magnitude of the electromagnetic fields when transmitted by the RFID transceivers 324 may be different than the values that are received by the RFID tag 222. Similarly, the values of the frequency, phase, and magnitude of the electromagnetic fields when transmitted by the RFID tag 222 may be different that the values that are received by the RFID transceivers 324. For example, in general the received electric power by an antenna decreases by $1/D^2$ where D is the distance between the transmitting antenna and the receiving antenna. Variations in transmitted and received frequency and phase may occur due to the phenomenon known as the Doppler effect, which occurs when a receiving antenna is moving in reference to the transmitting antenna. The RFID transceivers 324 can gather and report a wide range of information to the vision-based fare collection system 300 by analyzing transmitted and received electromagnetic fields, including passenger location, distance, and speed.

Figure 4:
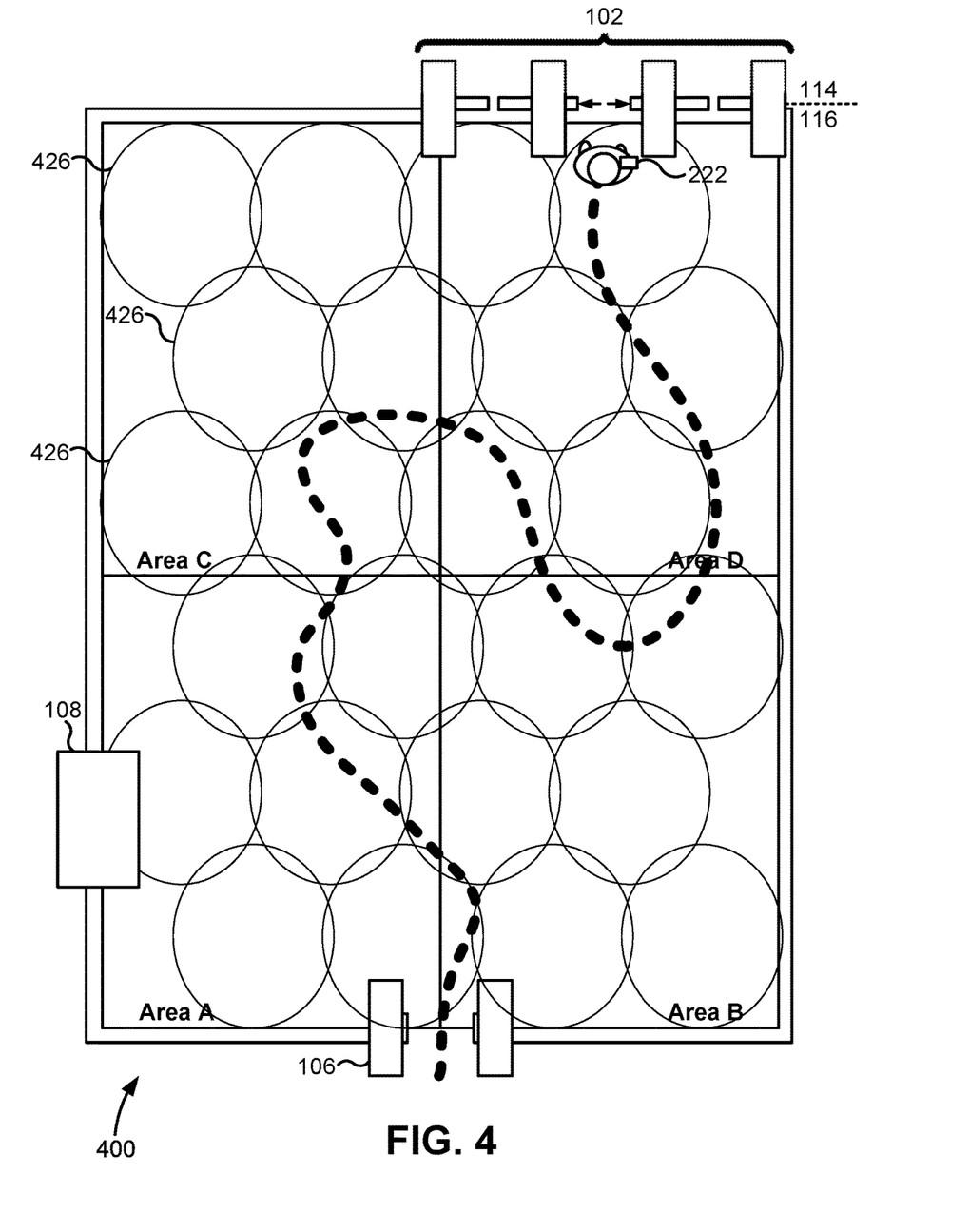
FIG. 4 shows a top view of a vision-based fare collection system with overhead RFID transceivers, according to some embodiments of the present disclosure.

FIG. 4 shows a top view of a vision-based fare collection system 400 with overhead RFID transceivers (not shown) that are configured to communicate with an RFID tag 222, according to some embodiments of the present disclosure. The RFID transceivers may be positioned along ceilings and other overhead objects within the transit station so that the beams of the antennas are directed in the vertical direction. Information gathered by the RFID transceivers while the RFID tag 222 is inside RFID coverage areas 426 may be utilized in the same manner as discussed in reference to FIG. 3. Overhead RFID transceivers may have advantages over side RFID transceivers depending on the size and layout of a transit station. For example, where a transit station has a large open walking area covered by a relatively low ceiling, overhead RFID transceivers may provide higher resolution location information than side RFID transceivers. In contrast, where a transit station has narrow walking areas covered by a relatively high ceiling, side RFID transceivers may provide higher resolution location information than overhead RFID transceivers. As passengers walk through different RFID coverage areas 426, transition information may be transmitted between different RFID transceivers much in the same way as was discussed in reference to passengers walking through different visual coverage areas 112.

Figure 5:
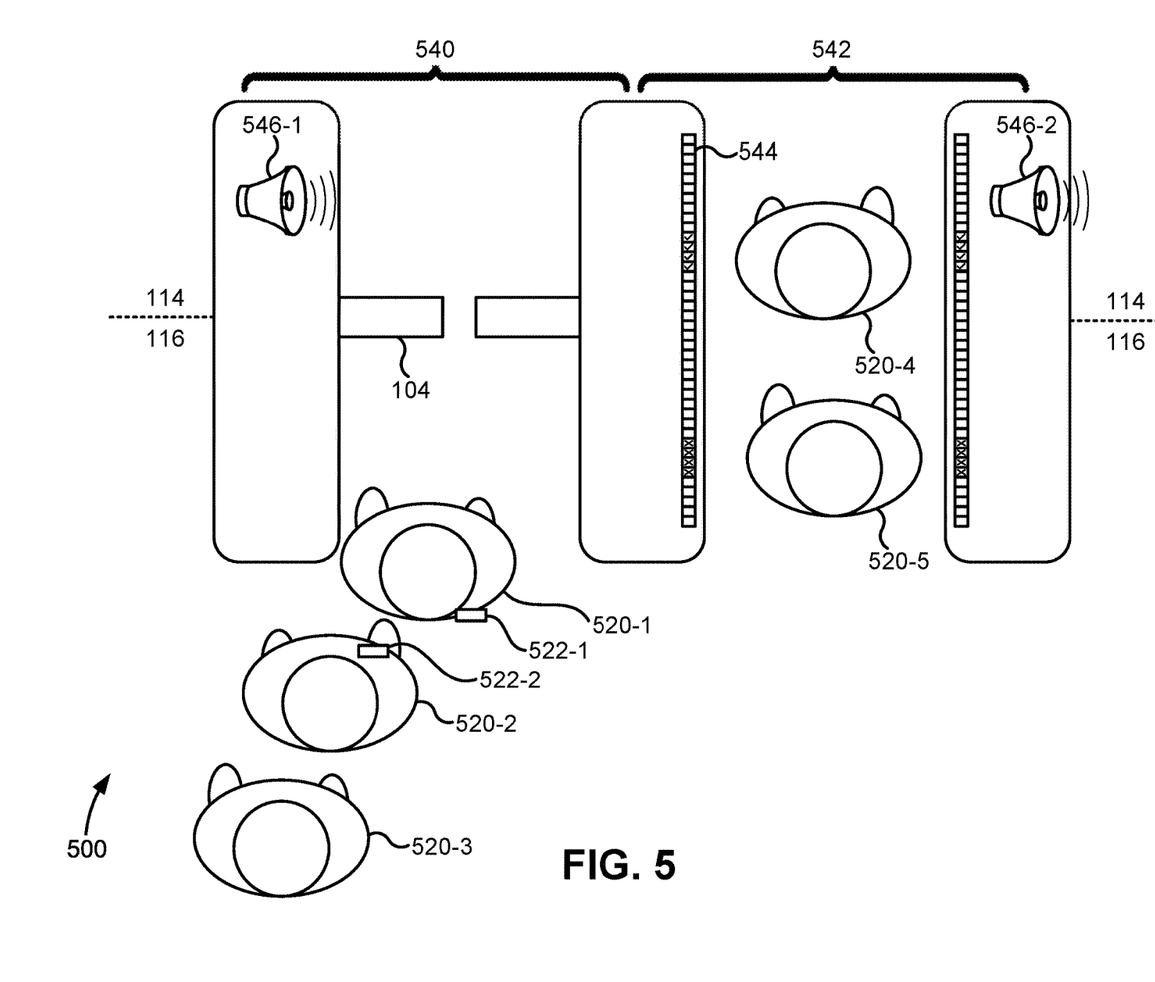
FIG. 5 shows a top view of a gate array within a vision-based fare collection system, according to some embodiments of the present disclosure.

FIG. 5 shows a top view of a gate array 500 within a vision-based fare collection system, according to some embodiments of the present disclosure. The gate array 500 includes two gates, gate 540 with a barrier 104, and gate 542 with no barriers, i.e., a barrierless gate. In some embodiments, the barrier 104 may be configured to retract when a passenger who is permitted to access the restricted access area 114 is near gate 540 and/or the gate array 500. In some embodiments, the barrier 104 may be retracted so that a passenger may continue to walk at a continuous speed through the gate array 102. The speed of a passenger may be determined using cameras and/or RFID transceivers.

As an example, passengers 520-1, 520-2, and 520-3 may approach gate 540 while walking close to each other. Passenger 520-1 may be carrying RFID tag 522-1 and may have previously been determined by the vision-based fare collection system to be permitted to access the restricted access area 114. Passenger 520-2 may be carrying RFID tag 522-2 and may have previously been determined to be permitted to access the restricted access area 114, and passenger 520-3 may not be carrying an RFID tag and may have previously been determined to not be permitted to access the restricted access area 114. In some embodiments, as passengers 520-1, 520-2, and 520-3 approach gate 540, the barrier 104 may be retracted to allow passengers 520-1 and 520-2 to pass through. If passenger 520-3 also passes through gate 540 before the barrier 104 is restored, an audible alarm and/or a visual alarm may be activated. For example, audible alarm 546-1 may output an audible alarm signal. In other embodiments, as passengers 520-1, 520-2, and 520-3 approach gate 540, the vision-based fare collection system may make a determination as to whether the unpermitted passenger, passenger 520-3, is too close to permitted passengers 520-1 and 520-2. If it is determined that passenger 520-3 is too close to either passenger 520-1 or 520-2, both passenger 520-1 and 520-2 may be denied access through gate 540 until passenger 520-3 is no longer too close.

Barrierless gates may have certain advantages over gates with barriers, such as a higher maximum passenger throughput. In some embodiments in which a barrierless gate is employed, an audible and/or a visual alarm may be activated to prevent an unpermitted passenger from accessing the restricted access area 114. For example, gate 542 may include audible alarm 546-2 and visual alarm 544. Visual alarm 544 may include a string of LEDs or displays positioned along one or both gate cabinets of gate 542 which provide a visual indicator as to whether a passenger is permitted or not permitted to access the restricted access area 114.

As an example, passengers 520-4 and 520-5 may approach gate 542 while walking close to each other. Neither passenger may be carrying RFID tags, however passenger 520-4 may have previously been determined by the vision-based fare collection system to be permitted to access the restricted access area 114 while passenger 520-5 may have previously been determined to not be permitted to access the restricted access area 114. In some embodiments, visual alarm 544 may include a string of displays that display either a check mark or an "X" alongside each passenger as they walk through gate 542. For example, because passenger 520-4 is permitted, check marks are displayed on both the left and right gate cabinets as he/she walks through gate 542. In contrast, because passenger 520-5 is not permitted, at least one "X" is displayed on both the left and right gate cabinets as he/she walks through gate 542. Visual alarm 544 can assist transit personnel to distinguish between permitted and unpermitted passengers that pass through barrierless gate 542.

Figure 6:
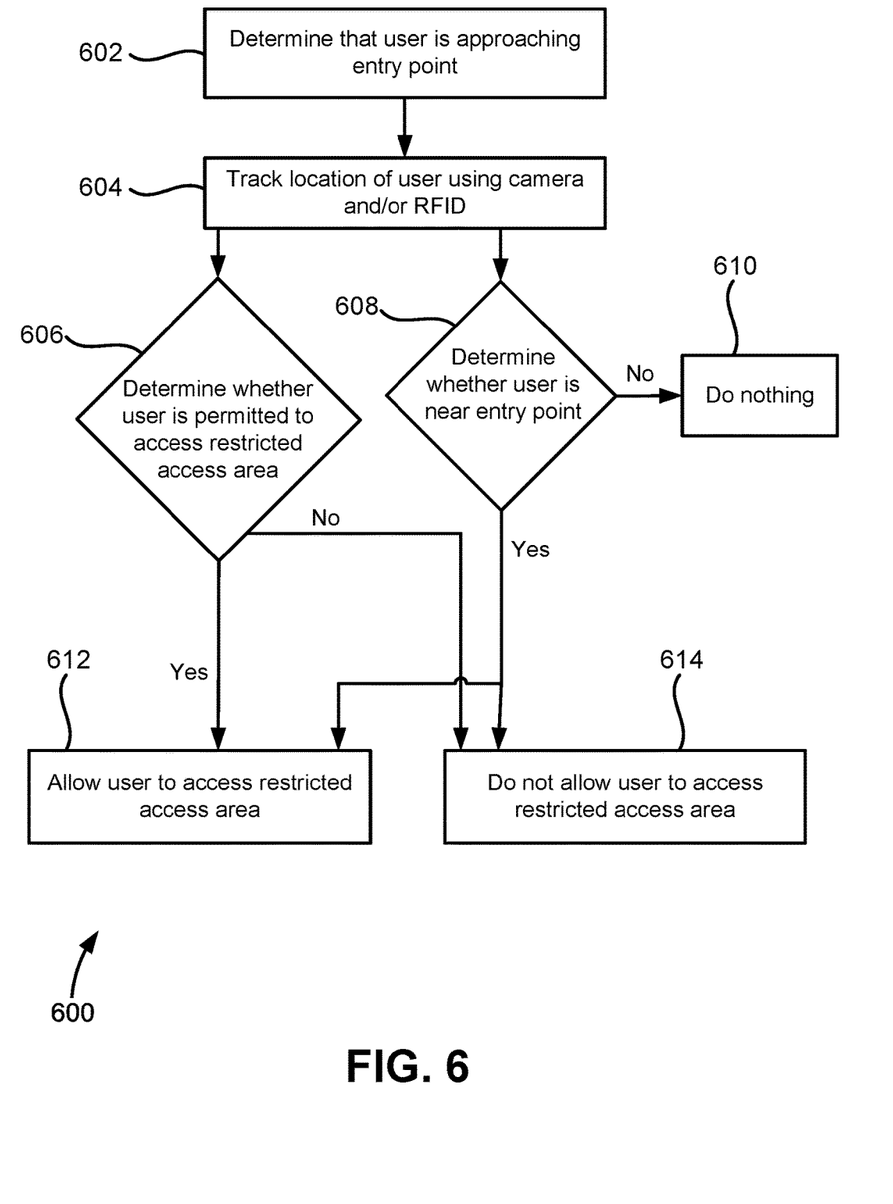
FIG. 6 shows a method for allowing a user to access a restricted access area, according to some embodiments of the present disclosure.

FIG. 6 shows a method 600 for allowing a user to access a restricted access area, according to some embodiments of the present disclosure. At step 602, it is determined that the user is approaching an entry point, such as the gate array 102. The determination may be made upon the user walking through the station entry 106 or upon the user being initially located by cameras and/or RFID transceivers. At step 604, the location of the user is tracked using cameras and/or RFID transceivers. At step 606, it is determined whether the user is permitted to access the restricted access area 114. This determination may be made based on the user having purchased a ticket at the ticket vending machine 108 or the user carrying an RFID tag linking to account information that indicates the user is permitted. At step 608, which may be performed before, after, and/or simultaneously with step 606, it is determined whether the user is near an entry point. In some embodiments, it may be determined that the user is near an entry point when the user is within 1 ft, 2 ft, 5 ft, 10 ft, 20 ft, or 40 ft of the entry point. In some embodiments, the determination may be made based on the speed of the user and may be set as a time threshold. For example, it may be determined that the user is near an entry point when the user is within 0.5 s, 1 s, 2 s, 5 s, or 10 s of arriving at the entry point. At step 610, the vision-based fare collection system may be configured to perform no action when it is determined that the user is not near an entry point. At step 612, the vision-based fare collection system may allow the user to access the restricted access area 114 when it is both determined that the user is permitted and that the user is near an entry point. At step 614, the vision-based fare collection system may not allow the user to access the restricted access area 114 when it is both determined that the user is not permitted and that the user is near an entry point.

Figure 7:
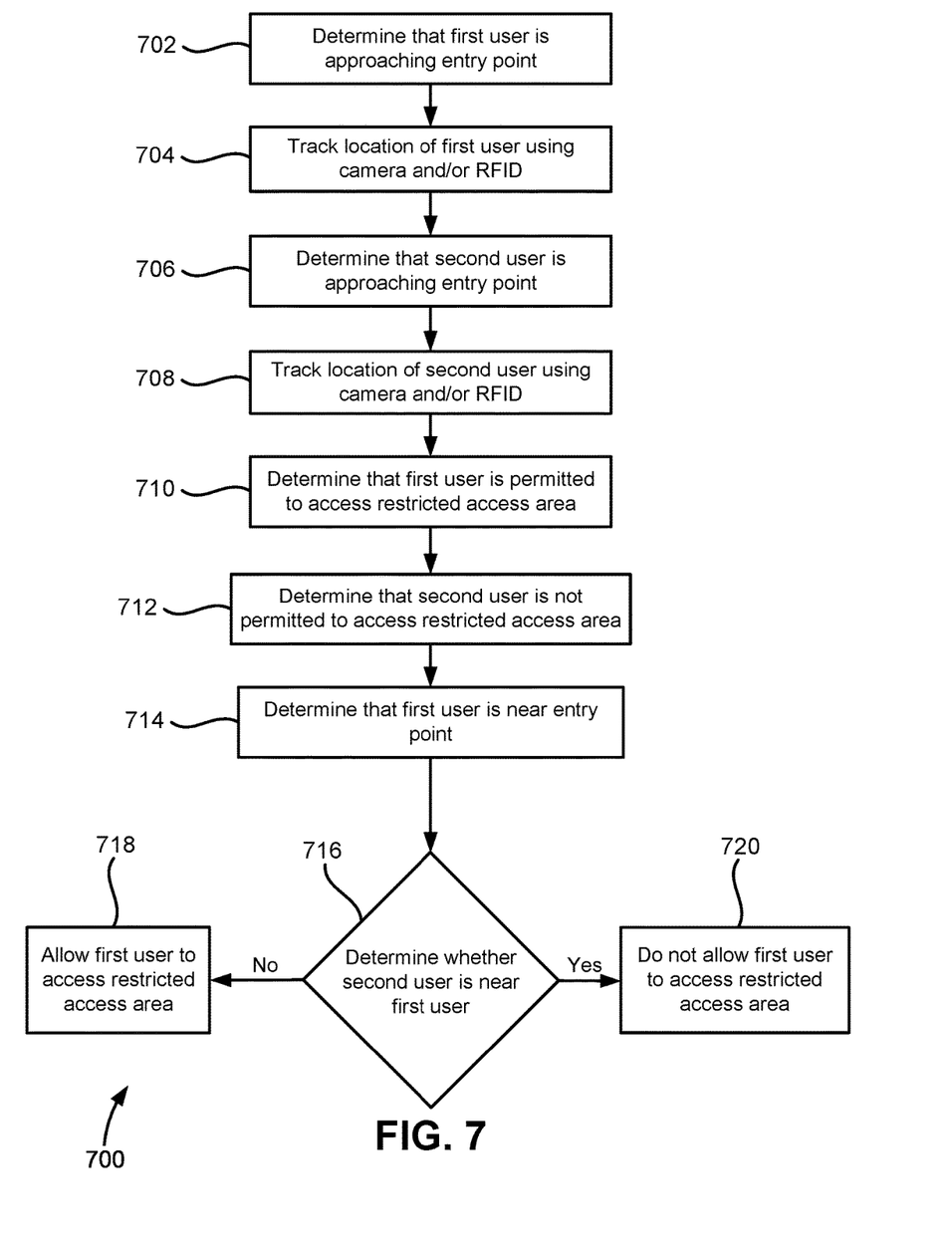
FIG. 7 shows a method for allowing a user to access a restricted access area, according to some embodiments of the present disclosure.

FIG. 7 shows a method 700 for allowing a user to access a restricted access area, according to some embodiments of the present disclosure. At step 702, it is determined that a first user is approaching an entry point. At step 704, the location of the first user is tracked using cameras and/or RFID transceivers. At step 706, it is determined that a second user is approaching an entry point. At step 708, the location of the second user is tracked using cameras and/or RFID transceivers. At step 710, it is determined that the first user is permitted to access the restricted access area 114. At step 712, it is determined that the second user is not permitted to access the restricted access area 114. At step 714, it is determined that the first user is near an entry point. At step 716, it is determined whether the second user is near the first user. In some embodiments, it may be determined that the second user is near the first user when the second user is within 1 ft, 2 ft, 5 ft, 10 ft, 20 ft, or 40 ft of the first user. In some embodiments, the determination may be based on the speeds of the first and second users. For example, it may be determined that the second user is near the first user when the second user will be within some distance threshold of the first user by the time the first user reaches the end of the gate. The vision-based fare collection system may therefore project the first and second user's paths and base the determination on the projected distances between the projected paths. At step 718, the vision-based fare collection system may allow the first user to access the restricted access area 114 when it is determined that the second user is not near the first user. At step 720, the vision-based fare collection system may not allow the first user to access the restricted access area 114 when it is determined that the second user is near the first user.

Figure 8:
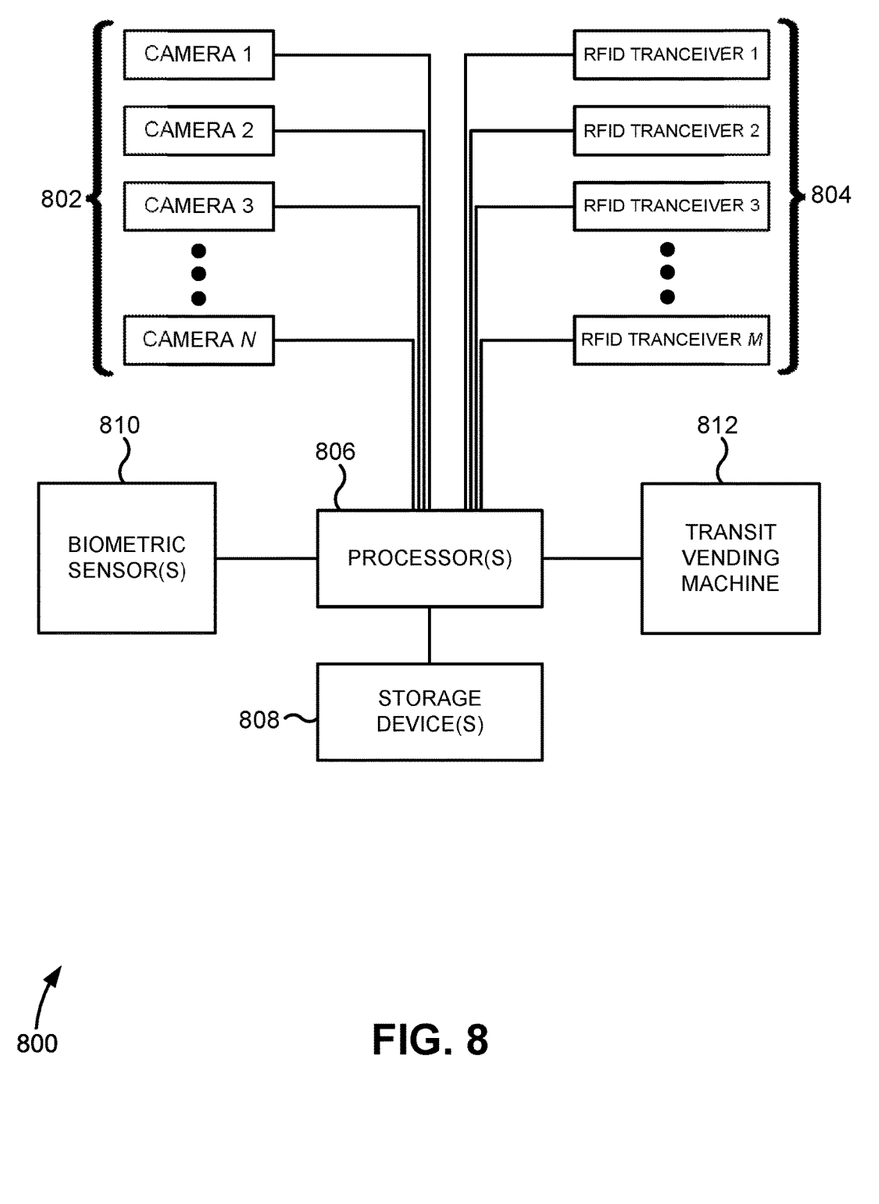
FIG. 8 shows a system diagram of a vision-based fare collection system, according to some embodiments of the present disclosure.

FIG. 8 shows a system diagram of a vision-based fare collection system 800, according to some embodiments of the present disclosure. In some embodiments, the vision-based fare collection system 800 includes a set of N cameras 802 and a set of MRFID transceivers 804 individually connected to a processor 806. In some embodiments, the cameras 802 and/or the RFID transceivers 804 are connected in a daisy chain such that they are connected to the processor 806 on one end. In some embodiments, the cameras 802, the RFID transceivers 804, and the processor 806 are combined in a single module that may communicate with other similar modules. The vision-based fare collection system 800 may also include a biometric sensor 810, a transit vending machine 812, and a storage device 808. The biometric sensor 810 may gather identifying information about passengers who enter a transit station, such as fingerprints, facial scan, height, weight, hair color, sample speech, 3-D/2-D gestures, and the like. The components of the vision-based fare collection system 800 may communicate wirelessly, via wired connections, or some combination of both.

Figure 9:
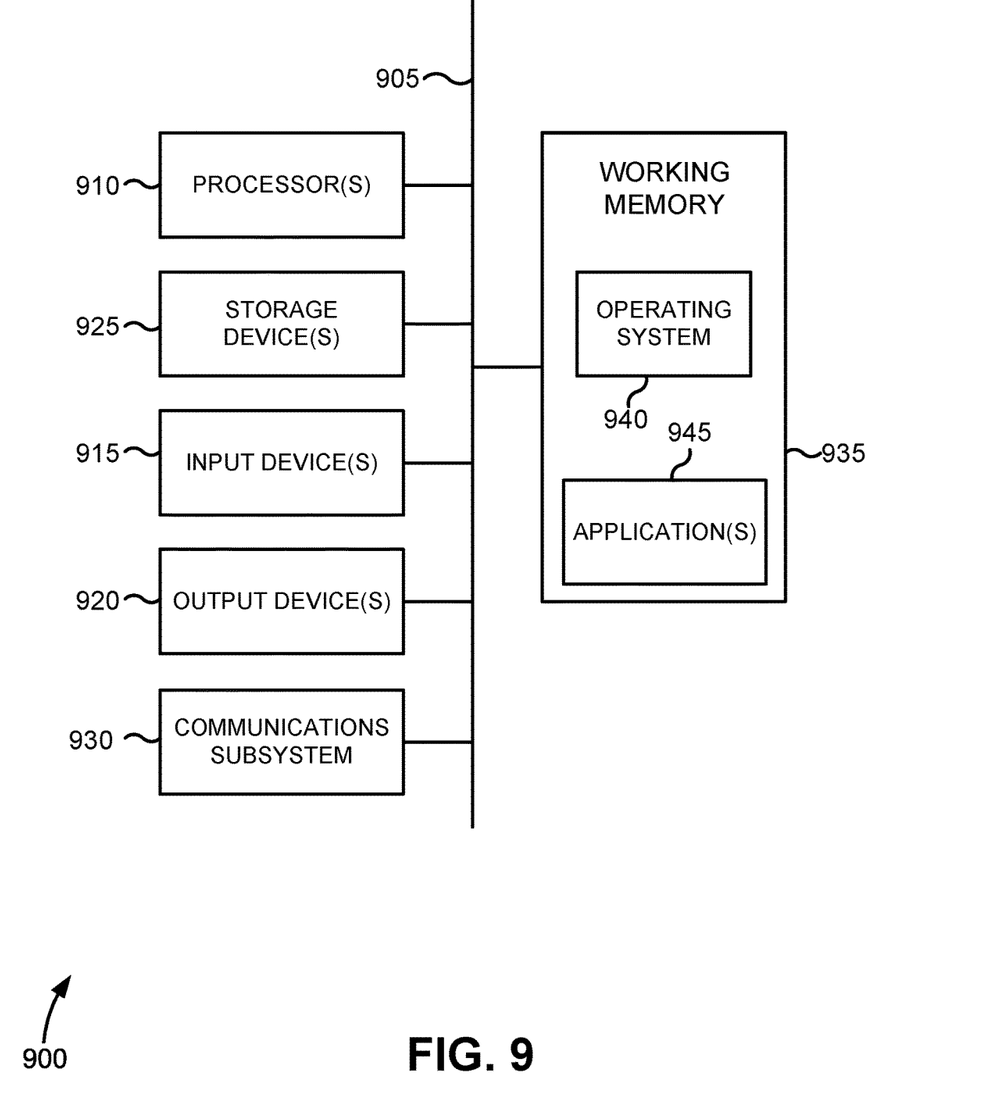
FIG. 9 shows a simplified computer system, according to some embodiments of the present disclosure.

FIG. 9 shows a simplified computer system 900, according to some embodiments of the present disclosure. A computer system 900 as illustrated in FIG. 9 may be incorporated into devices such as a portable electronic device, mobile phone, or other device as described herein. FIG. 9 provides a schematic illustration of one embodiment of a computer system 900 that can perform some or all of the steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905, or may otherwise be in communication, as appropriate. The hardware elements may include one or more processors 910, including without limitation one or more general-purpose processors and/or one or more special-purpose processors such as digital signal processing chips, graphics acceleration processors, and/or the like; one or more input devices 915, which can include without limitation a mouse, a keyboard, a camera, and/or the like; and one or more output devices 920, which can include without limitation a display device, a printer, and/or the like.

The computer system 900 may further include and/or be in communication with one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 930 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 930. In other embodiments, a portable electronic device, e.g. the first electronic device, may be incorporated into the computer system 900, e.g., an electronic device as an input device 915. In some embodiments, the computer system 900 will further comprise a working memory 935, which can include a RAM or ROM device, as described above.

The computer system 900 also can include software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 9, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 925 described above. In some cases, the storage medium might be incorporated within a computer system, such as computer system 900. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 900 to perform methods in accordance with various embodiments of the technology. According to a set of embodiments, some or all of the procedures of such methods are performed by the computer system 900 in response to processor 910 executing one or more sequences of one or more instructions, which might be incorporated into the operating system 940 and/or other code, such as an application program 945, contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 and/or components thereof generally will receive signals, and the bus 905 then might carry the signals and/or the data, instructions, etc. carried by the signals to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A computer-implemented method comprising:
   receiving an indication that a first user purchased a ticket at a ticket vending machine;
   determining, based on the indication, that the user is permitted to access the restricted access area;
   determining that the first user and a second user are approaching an entry point, the entry point defining a passageway and separating a non-restricted access area from a restricted access area;
   tracking, using a camera, the location of the first user and the second user as the first user and the second user approach the entry point;
   determining that the second user is not permitted to access the restricted access area;
   determining a first projected path of the first user;
   determining a second projected path of the second user;
   determining that the first user is within a first threshold distance from the entry point;
   in response to determining, based on the first projected path and the second projected path, that the first user will reach the end of the entry point prior to the second user reaching a second threshold distance from the entry point, allowing the first user to access the restricted access are via the entry point; and
   in response to determining, based on the first projected path and the second projected path, that the first user will reach the end of the entry point after the second user reaches the second threshold distance from the entry point, not allowing the first user to access the restricted access area via the entry point.

2. The computer-implemented method of claim 1, further comprising:
   determining a first speed of the first user; and
   determining a second speed of the second user;
   wherein:
      the first projected path is determined based on the first speed; and
      the second projected path is determined based on the second speed.

3. The computer-implemented method of claim 1, further comprising:
   detecting, using an RFID receiver, an RFID tag located within a particular distance from the second user, the RFID tag having information linking to an account balance of the second user;
   determining that the RFID tag is associated with the second user; and
   determining that the second user is not permitted to access the restricted access area based on the information linking to the account balance of the second user.

4. The computer-implemented method of claim 3, further comprising:
   facilitating tracking, using the RFID receiver, the location of the second user as the second user approaches the entry point.

5. The computer-implemented method of claim 1, wherein allowing the first user to access the restricted access area includes opening a gate or turnstile at the entry point.

6. The computer-implemented method of claim 1, further comprising:
   detecting, using a sensor, one or more unique identifiers associated with the first user.

7. The computer-implemented method of claim 1, wherein the ticket vending machine does not issue a physical ticket or an electronic ticket in response to the first user purchasing the ticket at the ticket vending machine.

8. A computer readable storage media comprising instructions to cause one or more processors to perform operations comprising:
   receiving an indication that a first user purchased a ticket at a ticket vending machine;
   determining, based on the indication, that the user is permitted to access the restricted access area;
   determining that the first user and a second user are approaching an entry point, the entry point defining a passageway and separating a non-restricted access area from a restricted access area;
   tracking, using a camera, the location of the first user and the second user as the first user and the second user approach the entry point;
   determining that the second user is not permitted to access the restricted access area;
   determining a first projected path of the first user;
   determining a second projected path of the second user;

determining that the first user is within a first threshold distance from the entry point;

in response to determining, based on the first projected path and the second projected path, that the first user will reach the end of the entry point prior to the second user reaching a second threshold distance from the entry point, allowing the first user to access the restricted access are via the entry point; and in response to determining, based on the first projected path and the second projected path, that the first user will reach the end of the entry point after the second user reaches the second threshold distance from the entry point, not allowing the first user to access the restricted access area via the entry point.

9. The computer readable storage media of claim 8, wherein the operations further comprise:

determining a first speed of the first user; and
determining a second speed of the second user;
wherein:
the first projected path is determined based on the first speed; and
the second projected path is determined based on the second speed.

10. The computer readable storage media of claim 8, wherein the operations further comprise:

detecting, using an RFID receiver, an RFID tag located within a particular distance from the second user, the RFID tag having information linking to an account balance of the second user;
determining that the RFID tag is associated with the second user; and
determining that the second user is not permitted to access the restricted access area based on the information linking to the account balance of the second user.

11. The computer readable storage media of claim 10, wherein the operations further comprise:

facilitating tracking, using the RFID receiver, the location of the second user as the second user approaches the entry point.

12. The computer readable storage media of claim 8, wherein allowing the first user to access the restricted access area includes opening a gate or turnstile at the entry point.

13. The computer readable storage media of claim 8, wherein the operations further comprise:

detecting, using a sensor, one or more unique identifiers associated with the first user.

14. The computer readable storage media of claim 8, wherein the ticket vending machine does not issue a physical ticket or an electronic ticket in response to the first user purchasing the ticket at the ticket vending machine.

15. A system comprising:

a camera;
one or more processors;
one or more computer readable storage mediums comprising instructions to cause the one or more processors to perform operations comprising:
receiving an indication that a first user purchased a ticket at a ticket vending machine;
determining, based on the indication, that the user is permitted to access the restricted access area;
determining that the first user and a second user are approaching an entry point, the entry point defining a passageway and separating a non-restricted access area from a restricted access area;
tracking, using a camera, the location of the first user and the second user as the first user and the second user approach the entry point;
determining that the second user is not permitted to access the restricted access area;
determining a first projected path of the first user;
determining a second projected path of the second user;
determining that the first user is within a first threshold distance from the entry point;
in response to determining, based on the first projected path and the second projected path, that the first user will reach the end of the entry point prior to the second user reaching a second threshold distance from the entry point, allowing the first user to access the restricted access are via the entry point; and
in response to determining, based on the first projected path and the second projected path, that the first user will reach the end of the entry point after the second user reaches the second threshold distance from the entry point, not allowing the first user to access the restricted access area via the entry point.

16. The system of claim 15, wherein the operations further comprise:

determining a first speed of the first user; and
determining a second speed of the second user;
wherein:
the first projected path is determined based on the first speed; and
the second projected path is determined based on the second speed.

17. The system of claim 15, wherein the operations further comprise:

detecting, using an RFID receiver, an RFID tag located within a particular distance from the second user, the RFID tag having information linking to an account balance of the second user;
determining that the RFID tag is associated with the second user; and
determining that the second user is not permitted to access the restricted access area based on the information linking to the account balance of the second user.

18. The system of claim 17, wherein the operations further comprise:

facilitating tracking, using the RFID receiver, the location of the second user as the second user approaches the entry point.

19. The system of claim 15, wherein allowing the first user to access the restricted access area includes opening a gate or turnstile at the entry point.

20. The system of claim 15, wherein the ticket vending machine does not issue a physical ticket or an electronic ticket in response to the first user purchasing the ticket at the ticket vending machine.

* * * * *